US009483820B2

United States Patent
Lim et al.

(10) Patent No.: US 9,483,820 B2
(45) Date of Patent: Nov. 1, 2016

(54) METHOD AND SYSTEM FOR DETECTING A DAMAGED COMPONENT OF A MACHINE

(71) Applicant: General Electric Company, Schenectady, NY (US)

(72) Inventors: Ser Nam Lim, Niskayuna, NY (US); Jilin Tu, Rexford, NY (US); Li Guan, Clifton Park, NY (US); Craig Ronald Hoffmann, Ashtonfield (AU)

(73) Assignee: General Electric Company, Niskayuna, NY (US)

( * ) Notice: Subject to any disclaimer, the term of this patent is extended or adjusted under 35 U.S.C. 154(b) by 123 days.

(21) Appl. No.: 14/282,296

(22) Filed: May 20, 2014

(65) Prior Publication Data
US 2015/0339810 A1 Nov. 26, 2015

(51) Int. Cl.
*G06K 9/00* (2006.01)
*G06T 7/00* (2006.01)
*G06K 9/62* (2006.01)
(Continued)

(52) U.S. Cl.
CPC .............. *G06T 7/001* (2013.01); *G06K 9/46* (2013.01); *G06K 9/4642* (2013.01); *G06K 9/52* (2013.01); *G06K 9/62* (2013.01); *G06K 9/6215* (2013.01); *G06K 9/6218* (2013.01); *G06K 9/6267* (2013.01); *G06T 2207/10016* (2013.01); *G06T 2207/30164* (2013.01)

(58) Field of Classification Search
CPC ............. G06T 7/001; G06T 2207/30164; G06T 2007/10016; G06K 9/47; G06K 9/62; G06K 9/6267; G06K 9/6215; G06K 9/4642; G06K 9/6218; G06K 9/52

USPC ........................ 382/152, 141, 145
See application file for complete search history.

(56) References Cited

U.S. PATENT DOCUMENTS

| 4,496,971 A | * | 1/1985 | West | G01B 11/024 348/125 |
| 5,204,911 A | * | 4/1993 | Schwartz | G06K 9/6202 348/92 |

(Continued)

FOREIGN PATENT DOCUMENTS

| CA | 2546758 A1 | 11/2007 |
| CA | 2546758 C | 11/2007 |

(Continued)

*Primary Examiner* — Samir Ahmed
(74) *Attorney, Agent, or Firm* — John P. Darling

(57) ABSTRACT

A method and system for detecting a damaged machine component during operation of the machine are provided. The damaged machine component detection system includes one or more processors, one or more memory devices communicatively coupled to the one or more processors, an image capture device configured to generate a stream of temporally-spaced images of a scene including a machine component of interest, the images generated in real-time, and a grouping model configured to compare features of a current image of the stream of images to features of previously captured images sorted into a plurality of groups of images having similar features, generate an alert if predetermined features of the current image deviate from corresponding features of the grouped images by a predetermined amount, and update the groups with the current image if the predetermined features of the current image are similar to corresponding features of the grouped images by a predetermined amount. The system also includes an output device configured to output at least one of the alert and the current image.

18 Claims, 7 Drawing Sheets

(51) Int. Cl.
*G06K 9/52* (2006.01)
*G06K 9/46* (2006.01)

(56) References Cited

U.S. PATENT DOCUMENTS

| | | |
|---|---|---|
| 8,218,852 B2 | 7/2012 | Cork et al. |
| 8,411,930 B2 | 4/2013 | Ridley et al. |
| 8,543,237 B2 | 9/2013 | Slettemoen et al. |
| 8,544,168 B2 | 10/2013 | Kaida et al. |
| 2002/0128790 A1* | 9/2002 | Woodmansee ......... B23P 6/002 702/81 |
| 2005/0002572 A1* | 1/2005 | Saptharishi ............. G06K 9/80 382/224 |
| 2008/0281554 A1 | 11/2008 | Cork et al. |
| 2009/0060278 A1* | 3/2009 | Hassan-Shafique G06K 9/00771 382/103 |
| 2010/0142759 A1 | 6/2010 | Ridley et al. |
| 2010/0286812 A1 | 11/2010 | Slettemoen et al. |
| 2011/0285837 A1* | 11/2011 | Bello ................... G06T 7/0083 348/79 |
| 2013/0114878 A1* | 5/2013 | Scheid ................... G06T 7/001 382/141 |
| 2013/0294644 A1 | 11/2013 | Cork et al. |

FOREIGN PATENT DOCUMENTS

| | | |
|---|---|---|
| CN | 101842188 A | 9/2010 |
| CN | 101939709 A | 1/2011 |
| EP | 2203273 A1 | 7/2010 |
| EP | 2203273 B1 | 6/2012 |
| GB | 2463385 B | 7/2012 |
| WO | 2007131326 A1 | 11/2007 |
| WO | 2008135856 A2 | 11/2008 |
| WO | 2009038465 A1 | 3/2009 |

* cited by examiner

METHOD AND SYSTEM FOR DETECTING A DAMAGED COMPONENT OF A MACHINE

BACKGROUND

This description relates to machines including a plurality of component parts, and, more particularly, to a method and system for detecting a damaged, broken, or missing component from a machine during operation and in real-time.

Many known mining operations use a large shovel to move material efficiently and expeditiously. A relatively common cause of unplanned shovel downtime for mining operations is missing shovel teeth. A missing shovel tooth that goes undetected can jam a downstream crusher, thereby disabling it for an extended period of time, and increasing the costs of mining operations.

BRIEF DESCRIPTION

In one embodiment, a damaged machine component detection system includes one or more processors, one or more memory devices communicatively coupled to the one or more processors, an image capture device configured to generate a stream of temporally-spaced images of a scene including a machine component of interest, the images generated in real-time, and a grouping model configured to compare features of a current image of the stream of images to features of previously captured images sorted into a plurality of groups of images having similar features, generate an alert after a predetermined time period if predetermined features of the current image deviate from corresponding features of the grouped images by greater than a predetermined amount, and update the groups with the current image if the predetermined features of the current image deviate from corresponding characteristics of the grouped images by less than the predetermined amount. The system also includes an output device configured to output at least one of the alert and the current image.

In another embodiment, a method of detecting a damaged machine component during operation of the machine is implemented using a computer device coupled to a user interface and a memory device. The method includes receiving by the computer device a plurality of temporally-spaced images, each image including at least a portion of a machine component and a background, each image including a plurality of pixels, detecting, in real-time, the at least a portion of the machine component in a current one of the plurality of images, comparing the detected at least a portion of the machine component in the current image to a detected at least a portion of the machine component in a previous image stored in the memory device, grouping the current image with previously grouped images based on the comparison, and outputting an alert notification based on the grouping.

In yet another embodiment, one or more non-transitory computer-readable storage media includes computer-executable instructions embodied thereon wherein when executed by at least one processor, the computer-executable instructions cause the processor to receive, in real-time, a plurality of temporally-spaced images of a scene including a shovel bucket having a plurality of teeth spaced along a tooth line, detect at least a portion of the shovel bucket including the tooth line in a current one of the plurality of images, compare the current image to previously captured images sorted into a plurality of groups of similar characteristics, generate an alert if predetermined characteristics of the current image deviate from corresponding characteristics of the grouped images by a predetermined amount, update the groups with the current image if predetermined characteristics of the current image deviate from corresponding characteristics of the grouped images by less than the predetermined amount, and output at least one of the alert and an image of the damaged component.

DRAWINGS

These and other features, aspects, and advantages of the present invention will become better understood when the following detailed description is read with reference to the accompanying drawings in which like characters represent like parts throughout the drawings, wherein.

Figure 1:
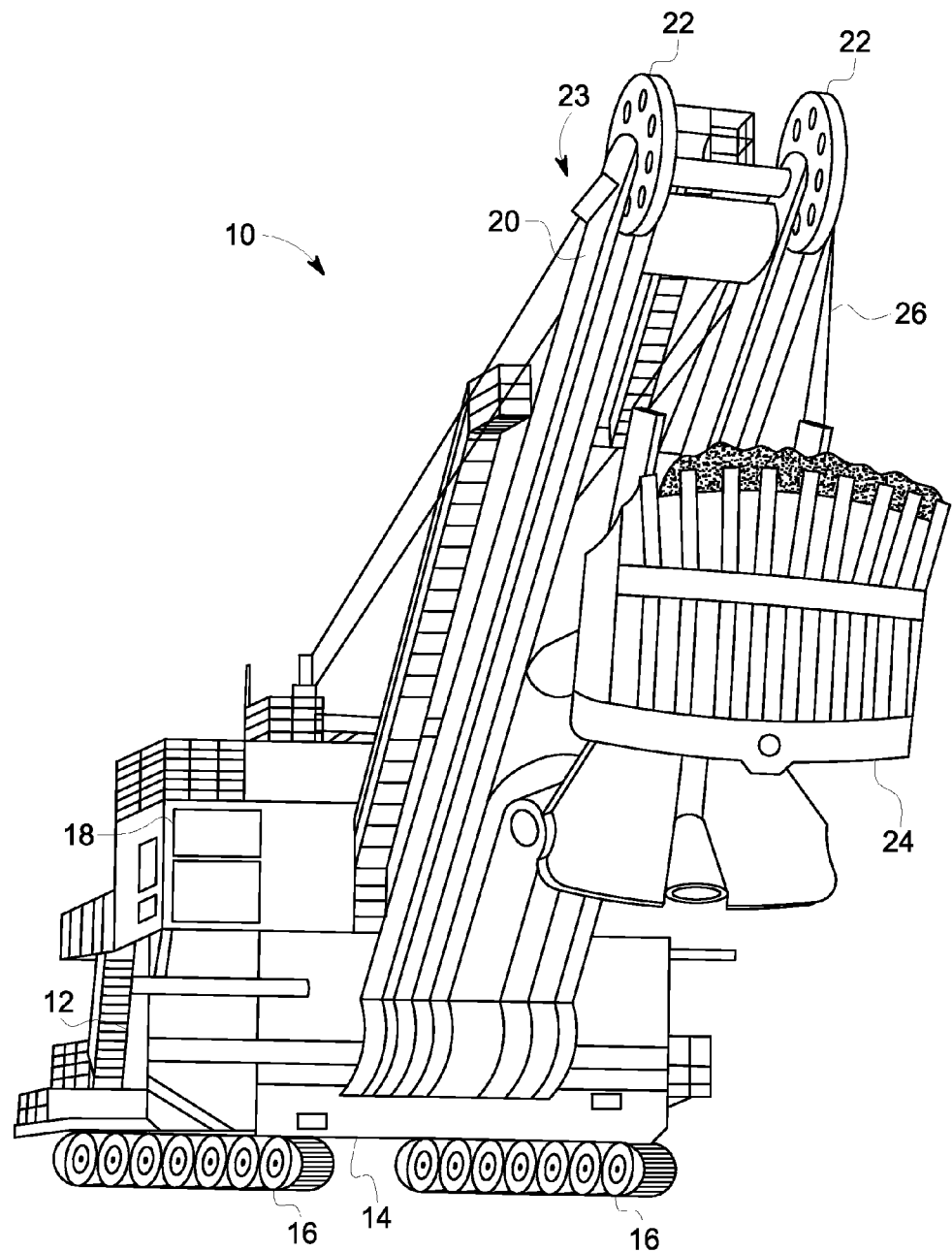
FIG. 1 is a perspective view of an exemplary cable shovel vehicle.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein. In the following specification and the claims, reference will be made to a number of terms, which shall be defined to have the following meanings.

DETAILED DESCRIPTION

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure describe a damaged machine component detection system. The system includes one or more processors, one or more memory devices communicatively coupled to the one or more processors, and an image capture device configured to generate a stream of temporally-spaced images of a scene including a machine component of interest, the images generated in real-time. The system also includes a grouping model configured to compare features of a current image of the stream of images to features of previously captured images sorted into a plurality of groups of images having similar features. The grouping model may be embodied in for example a clustering engine that operates in either a supervised or unsupervised mode. Moreover, the grouping model may include a plurality of individual models. The grouping model is also configured to generate an alert if predetermined features of the current image deviate from corresponding features of the grouped images by a predetermined amount. In various embodiments, the predetermined features of a predetermined number of successive images are monitored for deviation from corresponding features of the grouped images before an alert is generated to facilitate preventing false alerts. The grouping model is further configured to update the groups with the current image if the predetermined features of the current image deviate from corresponding characteristics of the grouped images by less than the predetermined amount. The system further includes an output device configured to output at least one of the alert and the current image.

The system also includes a machine component detector configured to receive the images in real-time and detect the machine component of interest in a current one of the plurality of images. In one embodiment, the machine component detector is further configured to detect at least a portion of the shovel bucket including a tooth line of a shovel bucket using a feature vector analysis, such as, but, not limited to using a Histogram of Gradients (HoG) analysis and/or to perform a spatial pyramid or a multi-scale, multi-orientation, sliding window procedure to detect the location of a tooth line in the image based on a tooth line HoG signature. The sliding window procedure may include processing the entire image or may only entail a search in a limited image region due to the shovel moving in known trajectory through only the limited image region. Moreover, images acquired at certain points in the trajectory of the shovel may be compared to other images taken at the same point in the trajectory. For example, certain images may capture only a portion of the shovel and those certain images may be processed together to determine the location of the tooth line and the condition of the teeth that are able to be determined in those certain images.

The grouping model is also configured to add the current image to a group with previously grouped images that have features similar to the current image. In one embodiment the previously grouped images are organized into groups based on at least one of regions of the respective image where the at least a portion of the tooth line was detected, the image size, and an orientation of the at least a portion of the tooth line. In various embodiments, the grouping model is further configured to group the current image based on features of the current image and an average of the features of the previously grouped images. In still further embodiments, the grouping model is further configured to compare a new detection to each group center, typically an average of all the features in the group, using a similarity measure such as, but not limited to, a Bhattacharrya distance or chi-square differences.

A computer-implemented method of detecting a damaged machine component during operation of the machine is also described. The method is implemented using a computer device coupled to a user interface and a memory device. The method includes receiving a plurality of temporally-spaced images, each image including at least a portion of a machine component and a background, each image including a plurality of pixels. The method further includes detecting, in real-time, the at least a portion of the machine component in a current one of the plurality of images and comparing the detected at least a portion of the machine component in the current image to a detected at least a portion of the machine component in a previous image stored in the memory device. In various embodiments, the at least a portion of the machine component is detected using a feature vector analysis such as, but, not limited to a Histogram of Gradients (HoG) analysis. In other embodiments, a multi-scale, multi-orientation, sliding window procedure to detect the location of a tooth line in the image based on a tooth line HoG signature is also performed. The method includes grouping the current image with previously grouped images based on the comparison and outputting an alert notification based on the grouping. In some embodiments, the predetermined features of a predetermined number of successive images are monitored for deviation from corresponding features of the grouped images before an alert is generated to facilitate preventing false alerts. In various embodiments, the grouping includes adding the current image to a group with previously grouped images based on a similarity of features in the current image to features in images of the group. In other embodiments, the grouping includes grouping the current image into groups based on at least one of regions of the respective image based on where the at least a portion of the machine component was detected, the image size and/or an orientation of the at least a portion of the machine component. In some embodiments, the current image is grouped based on an average of all the features in the group, using a predetermined or selectable similarity measure of the previously grouped images.

The following description refers to the accompanying drawings, in which, in the absence of a contrary representation, the same numbers in different drawings represent similar elements.

FIG. 1 is a perspective view of a cable shovel vehicle 10 in accordance with an exemplary embodiment of the present disclosure. In the exemplary embodiment, cable shovel 10 includes a shovel body 12 that is mounted for rotation on a base 14. Base 14 includes a pair of treads 16 that powered by a motor (not shown) so that shovel 10 may be driven around a work site of, for example, a mine. The motor may be a diesel engine, electric motors or an electric motor receiving power from a motor-generator set carried on shovel vehicle 10. Shovel vehicle 10 is controlled by an operator in a cab 18. A boom 20 extends upward from shovel body 12 and is connected at its lower end to shovel body 12. In the exemplary embodiment, boom 20 is maintained in a fixed position with respect to shovel body 12, but may also be movable with respect to shovel body 12, for example, boom 20 may be able to be raised and lowered with respect to shovel body 12. A pulley 22 is mounted on an upper end 23 of boom 20. A dipper bucket 24 is suspended from the boom 20 by a dipper cable 26 that extends over pulley 22. A winch (not shown) is mounted on shovel body 12 and secured to dipper cable 26. The winch includes a winch drum and a motor for winding and unwinding dipper cable 26 on the winch drum to raise and lower dipper bucket 24.

Figure 2:
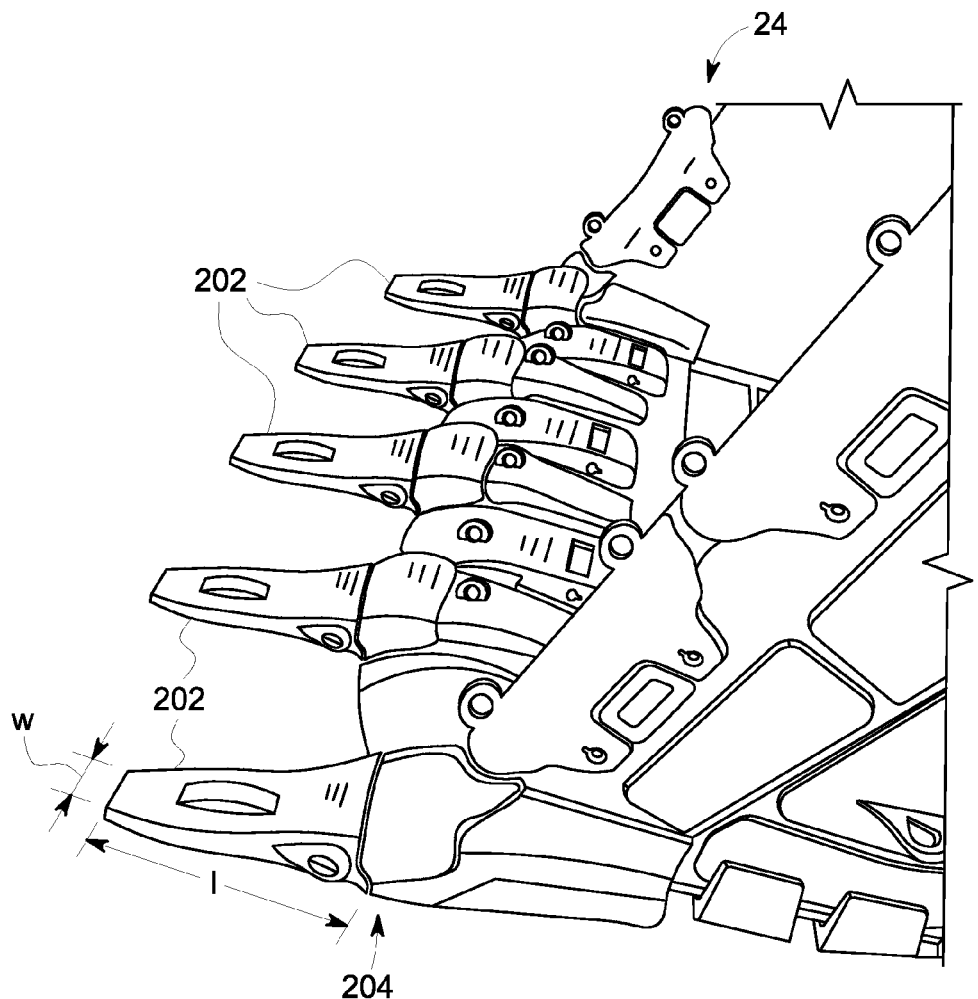
FIG. 2 is a perspective view of a portion of an exemplary dipper bucket that may be used with the cable shovel vehicle shown in FIG. 1.

FIG. 2 is a perspective view of a portion of dipper bucket 24. In the exemplary embodiment, dipper bucket 24 includes a plurality of teeth 202 spaced laterally across a front lip or tooth line 204 of dipper bucket 24. Each tooth 202 has an associated length l and a width w. If, during operation, one or more of teeth 202 becomes broken or worn beyond a predetermined threshold, length l and/or width w will change relative to a starting length l and width w.

Figure 3:
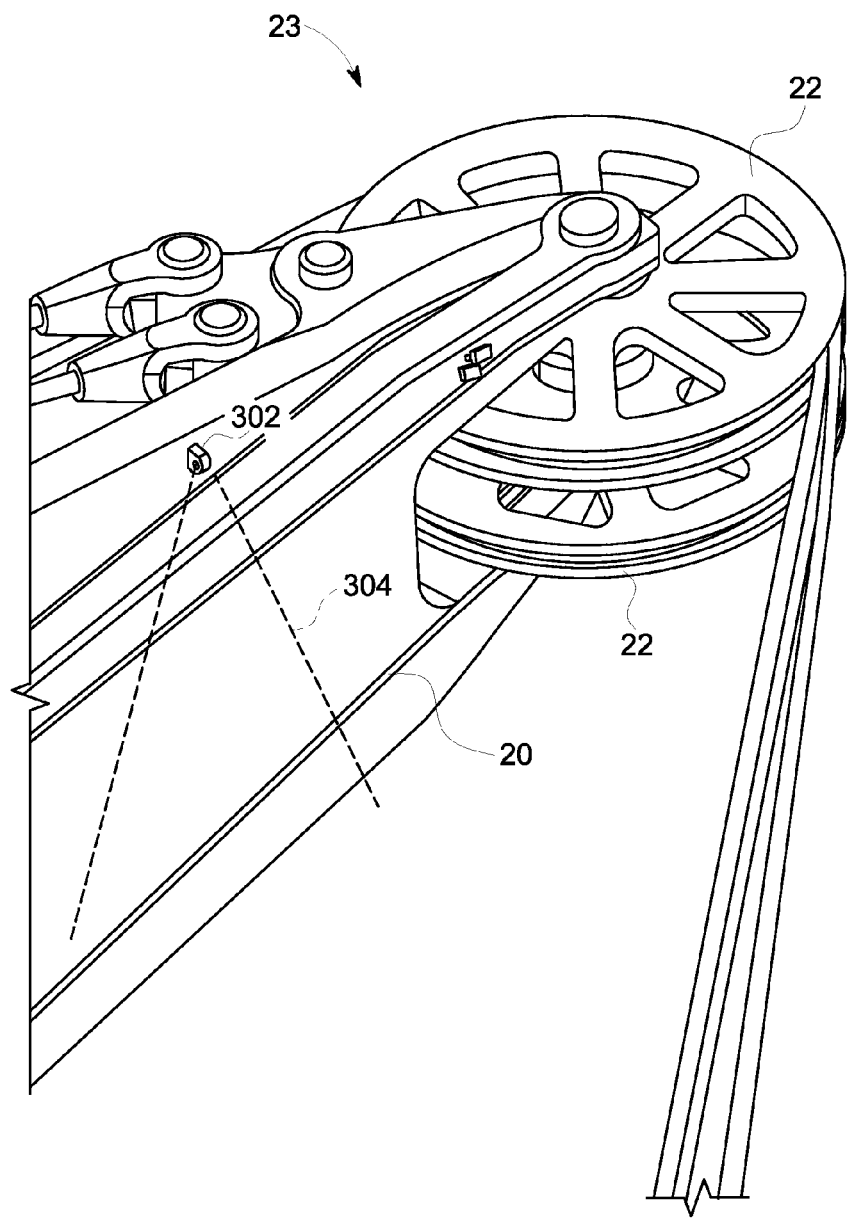
FIG. 3 is a perspective view of an exemplary upper end of an exemplary boom and exemplary pulleys that may be used with the cable shovel vehicle shown in FIG. 1.

FIG. 3 is a perspective view of upper end 23 of boom 20 and pulleys 22. In various embodiments, an image capture device 302, such as, but, not limited to a video camera is mounted on boom 20. Image capture device 302 includes a field of view 304 that is oriented in a downward direction pointing toward dipper bucket 24 (shown in FIG. 1).

Figure 4:
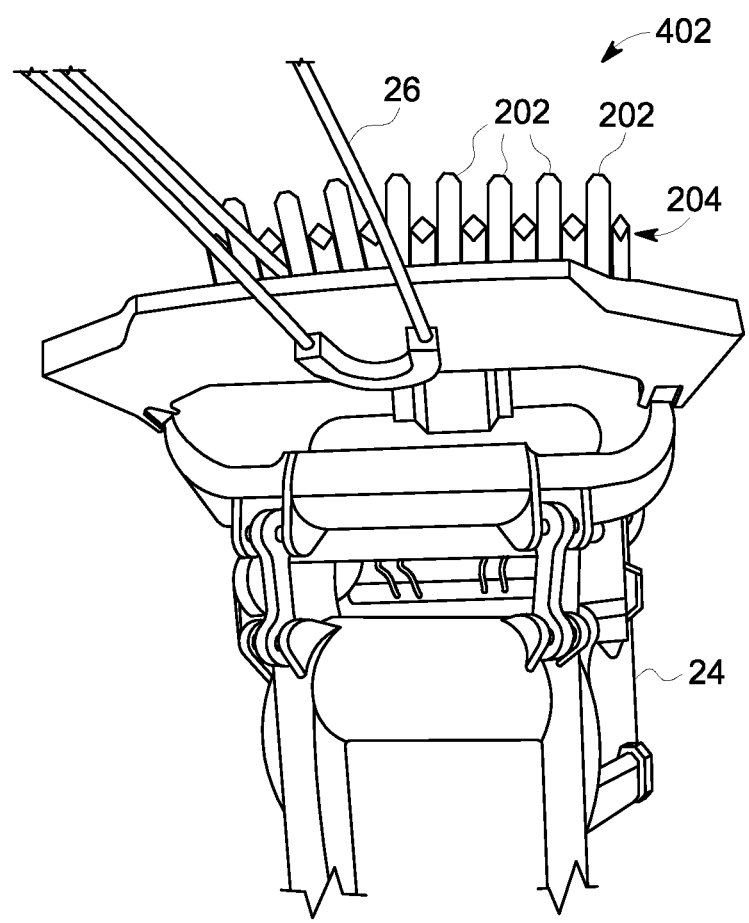
FIG. 4 is a view of the dipper bucket shown in FIG. 1 through an exemplary image capture device shown in FIG. 3.

FIG. 4 is a view 402 of dipper bucket 24 through image capture device 302 (shown in FIG. 3). View 402 is an example of a single or current image that is acquired by image capture device 302. Image capture device 302 continually acquires images that are temporally-spaced in real-time. Differing views 402 of dipper bucket 24 are acquired as dipper bucket 24 moves up and down with respect to image capture device 302. A background of view 402 also changes as dipper bucket 24 digs into a seam of ore or overlay rock and dirt. A full view of tooth line 204 cannot always be discerned in view 402 because of the changes in view 402 as shovel vehicle 10 (shown in FIG. 1) is operating.

Figure 5:
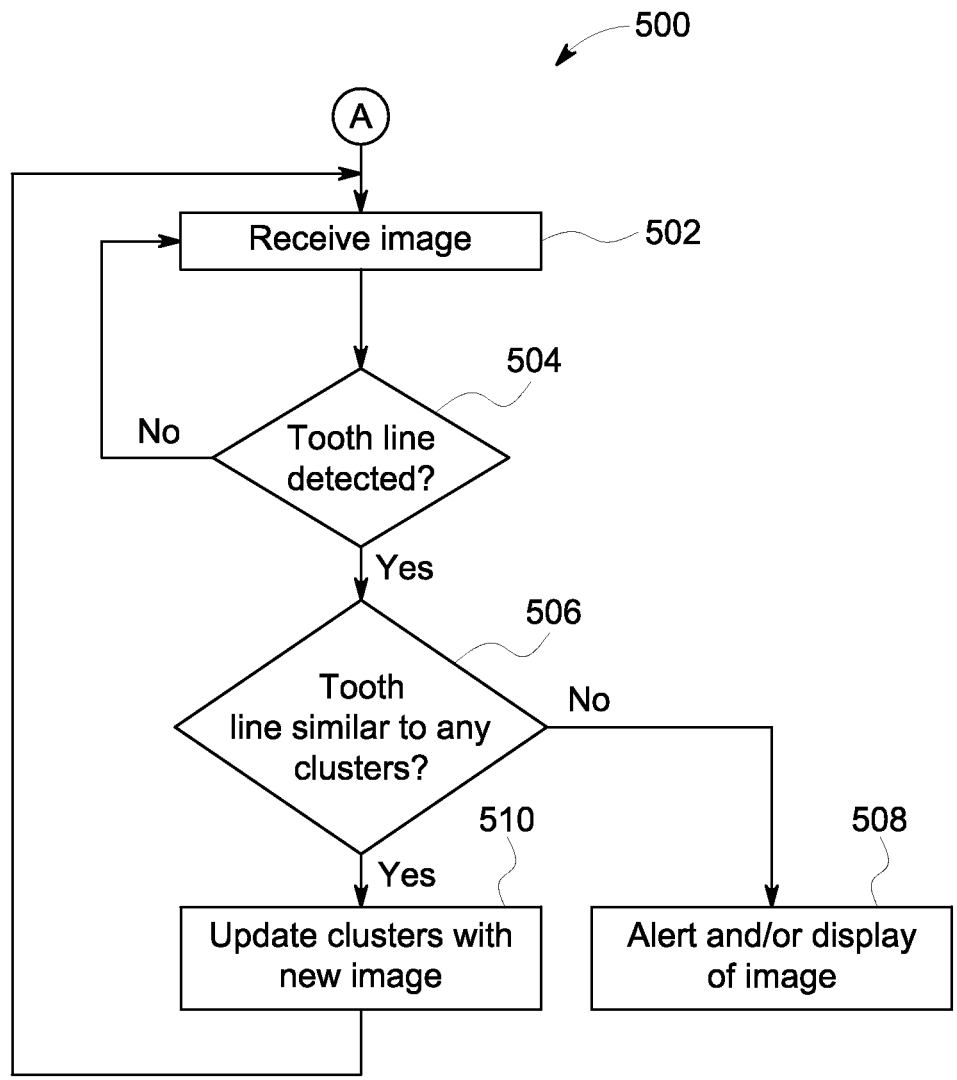
FIG. 5 is a flow chart of a process of detecting a broken or worn tooth associated with an exemplary tooth line shown in FIG. 2.

FIG. 5 is a flow chart of a process 500 of detecting a broken or worn tooth 202 associated with tooth line 204 (both shown in FIG. 1). Process 500 is implemented by one or more processors (not shown in FIG. 5) communicatively coupled to one or more memory devices (not shown in FIG. 5). In implementing process 500, the one or more processors are programmed to receive 502 a current image including a view of dipper bucket 24, dipper cable 26 (both shown in FIG. 1), and a background.

The one or more processors are programmed to analyze 504 the current image attempting to detect at least a portion of dipper bucket 24 including tooth line 204. In various embodiments, tooth line 204 is detected using a feature vector analysis such as, but, not limited to a Histogram of Gradients (HoG) analysis. In other embodiments, a multi-scale, multi-orientation, sliding window procedure to detect at least a portion of the shovel bucket and the location of a tooth line in the image based on a tooth line HoG signature is also performed. If tooth line 204 is not detected, for example, if tooth line 204 is obscured by dirt, rocks, a portion of shovel vehicle 10 (shown in FIG. 1), or any other obstruction, the one or more processors are programmed to discard the current image and receive a next image, which becomes the current image.

If tooth line 204 is detected, features of detected tooth line 204 are compared 506 to previously analyzed images. The previously analyzed images are images that have been sorted into groups based on features detected in each of those images. In various embodiments, the features of detected tooth line 204 are compared to averages or other statistical representations of the previously analyzed images or portions of the images. If the current image and a predetermined number of subsequent images are not similar to previously analyzed images in any of the groups or is similar to previously analyzed images of a known defective tooth line, an alert is generated 508. Requiring a plurality of successive images to be dissimilar to the grouped images before an alert is generated facilitates reducing false alerts from being generated. If the current image is similar to previously analyzed images in one of the groups, the current image and/or a statistical representation of the current image is added 510 to the group to which it is most similar. Process 500 then begins again at receiving the next image.

Figure 6:
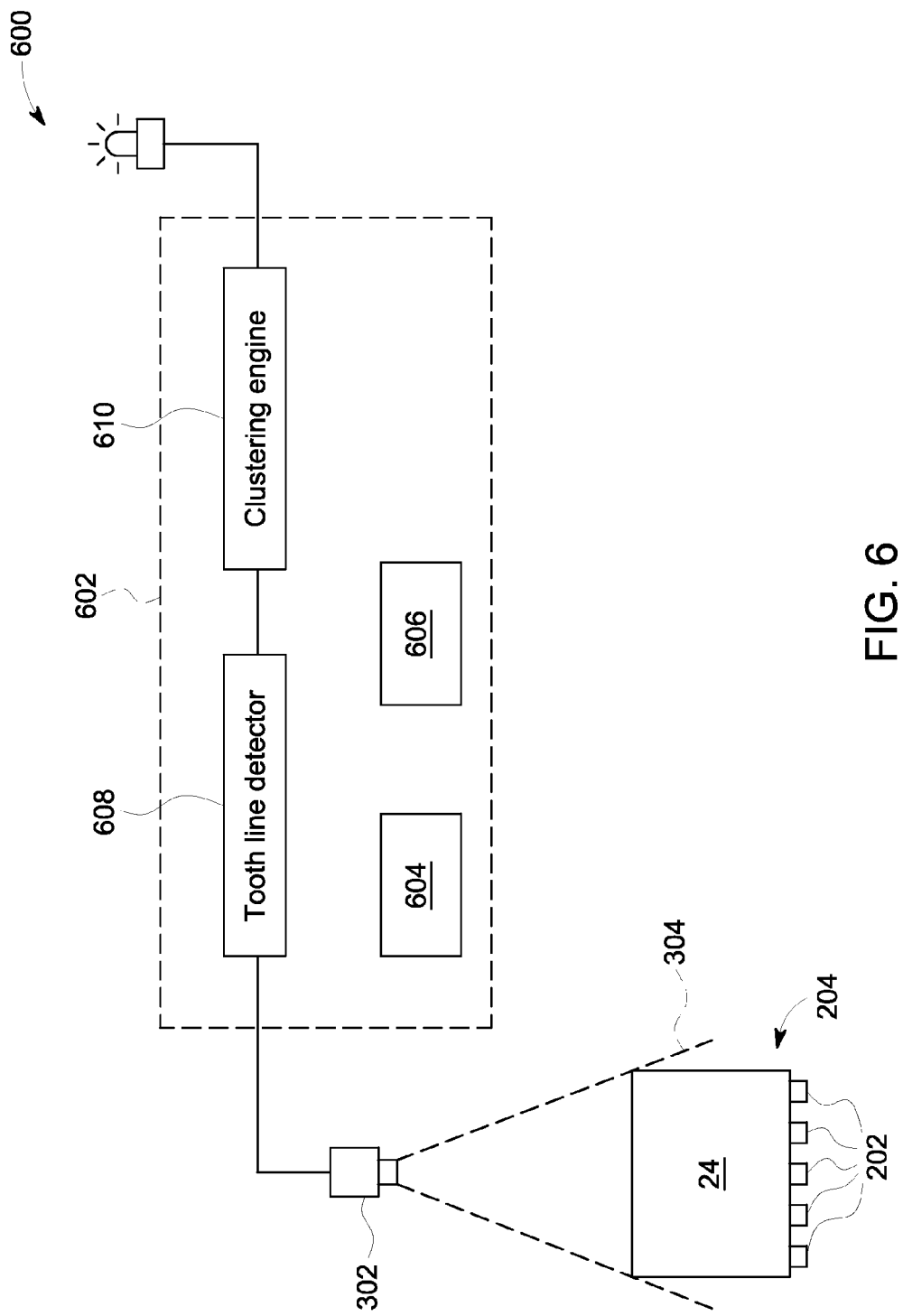
FIG. 6 is a schematic block diagram of an exemplary machine component detection system that may be used with the cable shovel vehicle shown in FIG. 1.

FIG. 6 is a schematic block diagram of a machine component detection system 600 in accordance with an exemplary embodiment of the present disclosure. In the exemplary embodiment, system 600 includes a processing device 602 including one or more processors 604 communicatively coupled to one or more memory devices 606. System 600 also includes a tooth line detector module 608 communicatively coupled to and configured to receive a stream of temporally-spaced digital images formed of a plurality of pixels from image capture device 302. A grouping model 610 receives images and/or representations of images that grouping model 610 analyzes to sort the images and/or representations of images into groups based on detected features in the images and/or representations of images. If grouping model 610 and/or tooth line detector module 608 determines, from a detected tooth line 204, that a current image being analyzed includes features representative of a missing, damaged, or worn tooth 202, an alert is output. In various embodiments, if the current image being analyzed and a predetermined number of successive images include features representative of a missing, damaged, or worn tooth 202, then the alert is generated. Using the current image being analyzed and a predetermined number of successive images before generating the alert facilitates preventing false alerts that could be generated if only a single image was used. If after an investigation of tooth 202, no actual damage is detected, that image is flagged to indicate a false positive indication from which grouping model 610 learns to avoid such false positive indications.

Figure 7:
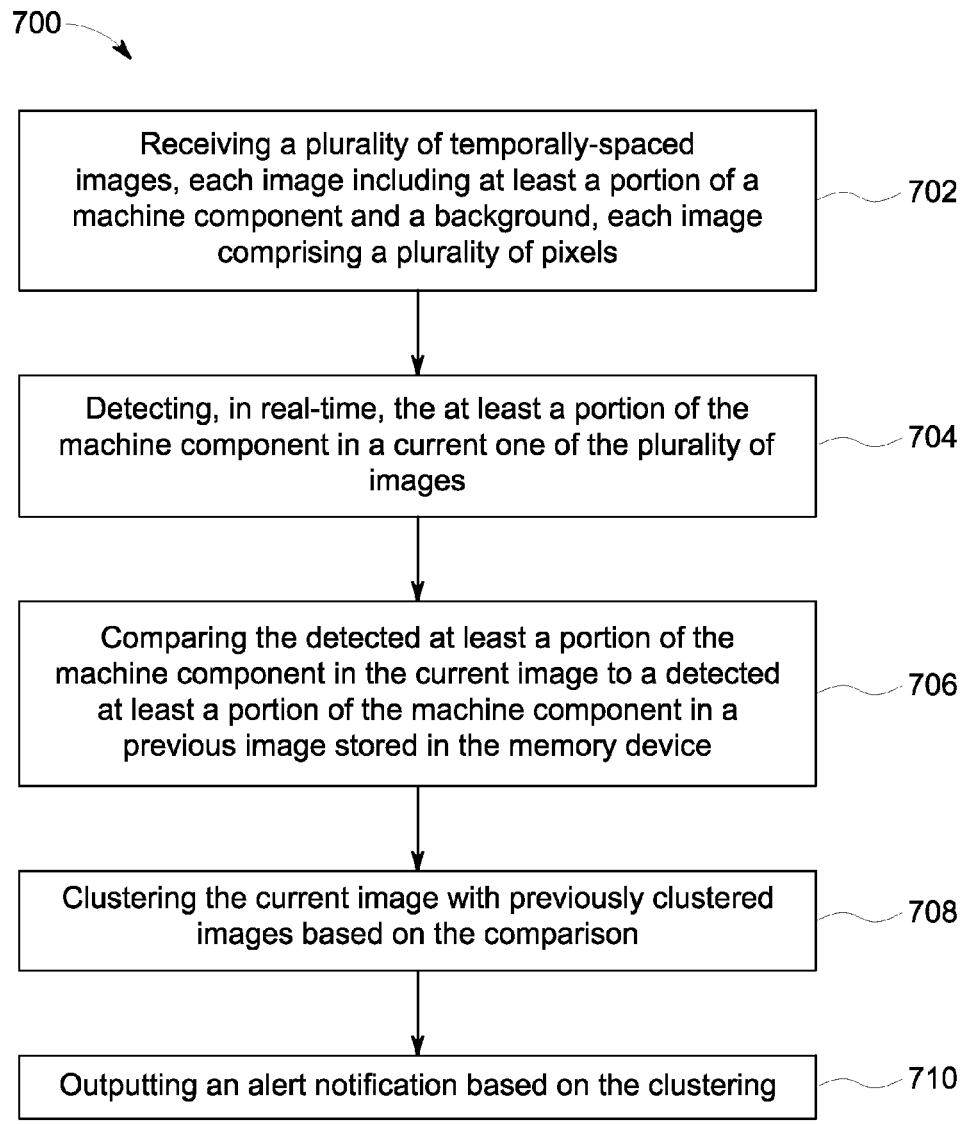
FIG. 7 is flow diagram of a method of detecting a damaged machine component during operation of a machine.

FIG. 7 is flow diagram of a method 700 of detecting a damaged machine component during operation of the machine. In the exemplary embodiment, method 700 includes receiving 702 a plurality of temporally-spaced images, each image including at least a portion of a machine component and a background, each image including a plurality of pixels. Typically, the images are streamed from a video camera in time sequence order and in real-time, however in some embodiments, the images are retrieved from a memory in any order, for example, by grouped group, or reverse time order. Method 700 also includes detecting 704, in real-time, the portion of the machine component in a current one of the plurality of images. In various embodiments, the portion of the machine component is detected using a feature vector analysis such as, but, not limited to a Histogram of Gradients (HoG) analysis. In other embodiments, other analysis such as, but not limited to a spatial pyramid and a multi-scale, multi-orientation, sliding window procedure is used to detect the location of the portion of the machine component in the image may be performed. Method 700 also includes comparing 706 the detected portion of the machine component in the current image to a detected portion of the machine component in a previous image or images stored in the memory device. Method 700 includes grouping 708 the current image with previously grouped images based on the comparison and outputting 710 an alert notification based on the grouping. If the comparison results in the current image and a predetermined number of successive images being different by a predetermined amount from previously grouped images, an alert is generated and the image is stored in an appropriate one of the groups. The alert permits an operator to stop the machine to investigate the difference. The alert is also used to generate machine control commands for automated operations.

The embodiment described herein assumes that a shovel always starts operation with its full set of teeth in good condition, which is a valid assumption because any missing tooth will be fixed before a shovel is operated. In this approach, the tooth line is detected in an image at time t, and compared with a series of images before it between $t-\Delta t_1$ and $t-\Delta t_2$, where $\Delta t_1 > \Delta t_2$. This set of earlier images is efficiently organized into groups according to an appearance of (e.g., HoG) the regions of the image where the tooth lines were detected as well as the image size and orientation of the detected tooth lines. The detected tooth line at time t is then compared to the group of tooth lines in same region, and at the same scale and orientation, which can be appropriately "averaged" for best effect. Any considerable deviation from the corresponding group is flagged. Images that do not display deviation are used to update the group.

A major benefit of this approach is that it is agnostic to the type of shovel, and is very efficient. Additionally, the averaging effect and the continual update (captured images are continuously being assign to these groups, each time triggering an update of the group characteristics) of the grouping procedure enhance its tolerance towards inevitable noise in the images and changing environment conditions.

FIGS. 5 and 7 are examples only and not intended to be restrictive. Other data flows may therefore occur in process 500 or method 700. The illustrated events and their particular order in time may vary. Further, the illustrated events may overlap and/or may exist in fewer steps. Moreover, certain events may not be present and additional and/or different events may be included.

The foregoing detailed description illustrates embodiments of the disclosure by way of example and not by way of limitation. It is contemplated that the disclosure has general application to the detection of damaged, worn or missing machine components in real-time during operation of the machine. It is further contemplated that the methods and systems described herein may be incorporated into existing imaging or detection systems, in addition to being maintained as a separate stand-alone application. As used herein, real-time refers to outcomes occurring at a substantially short period after a change in the inputs affecting the outcome, for example, events occurring in real-time occur without substantial intentional delay.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely exemplary or possible embodiments, and that there are many other combinations, additions, or alternatives that may be included.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) receiving a plurality of temporally-spaced images, each image including at least a portion of a machine component and a background, each image including a plurality of pixels, (b) detecting, in real-time, the at least a portion of the machine component in a current one of the plurality of images, (c) comparing the detected at least a portion of the machine component in the current image to a detected at least a portion of the machine component in a previous image stored in the memory device, (d) grouping the current image with previously grouped images based on the comparison, and (e) outputting an alert notification based on the grouping. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit including custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system of detecting damaged machine components provides a cost-effective and reliable means for operating machines that may lose components or portions of components to downstream systems or processes. More specifically, the methods and systems described herein facilitate alerting users to a component that is damaged or lost and that which may damage the downstream systems or processes. In addition, the above-described methods and systems facilitate identifying the component in images acquired in real-time during operation of the machine. As a result, the methods and systems described herein facilitate maintaining valuable machinery operating and avoiding downtime and maintenance in a cost-effective and reliable manner.

Exemplary methods and apparatus for automatically and continuously determining the condition of components of machines during operation of the machines in real-time are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A damaged machine component detection system comprising:
    a processor;
    a memory device communicatively coupled to said processor;
    an image capture device configured to generate a stream of temporally-spaced images of a scene including a machine component of interest, the images generated in real-time;
    a grouping model configured to:
        compare predetermined features of at least a portion of a current image of the stream of images to corresponding features of at least a corresponding portion of previously captured images, the previously captured images sorted into a plurality of groups based on a similarity of the predetermined features in the previously captured images;
        generate an alert if the predetermined features of the current image and a predetermined number of successive images deviate from corresponding features of the grouped images by greater than a predetermined amount;
        update the groups with the current image if the predetermined features of the current image deviate from the corresponding features of the grouped images by less than a predetermined amount; and
    a machine component detector configured to receive the images in real-time and detect the machine component of interest in a plurality of images using a Histogram of Gradients (HoG) analysis.

2. The system of claim 1, wherein the machine component is a shovel bucket and the machine component detector is further configured to detect at least a portion of the shovel bucket including a tooth line of the shovel bucket.

3. The system of claim 1, wherein the machine component detector is further configured to perform a multi-scale, multi-orientation, sliding window procedure to detect the location of a tooth line in the image based on a tooth line HoG signature.

4. The system of claim 1, wherein the machine component detector is further configured to perform a multi-scale, multi-orientation, sliding window procedure to detect the location of a tooth line in the image based on a selectable threshold of the sliding window.

5. The system of claim 1, wherein the grouping model is further configured to add the current image to a group with previously grouped images that have features similar to the current image.

6. The system of claim 1, wherein the grouping model is further configured to group the current image with previously grouped images that are organized into groups based on at least one of regions of the respective image where the at least a portion of the tooth line was detected, the image size, and an orientation of the at least a portion of the tooth line.

7. The system of claim 1, wherein the grouping model is further configured to group the current image with a similarity measure of the previously grouped images.

8. The system of claim 1, wherein the grouping model is embodied in a clustering engine that operates in at least one of a supervised mode and an unsupervised mode.

9. The system of claim 1, wherein the grouping model comprises a plurality of individual models.

10. A computer-implemented method of detecting a damaged machine component during operation of the machine, the method implemented using a computer device coupled to a user interface and a memory device, said method comprising:
receiving by the computer device a plurality of temporally-spaced images, each image including at least a portion of a machine component and a background, each image comprising a plurality of pixels;
detecting, in real-time, the at least a portion of the machine component in a current one of the plurality of images using a Histogram of Gradients (HOG) analysis;
comparing the detected at least a portion of the machine component in the current image to a detected at least a portion of the machine component in a previous image stored in the memory device;
outputting an alert notification based on the grouping.

11. The method of claim 10, wherein detecting the at least a portion of the machine component using a HoG analysis further comprises a multi-scale, multi-orientation, sliding window procedure to detect the location of a tooth line in the image based on a tooth line HoG signature.

12. The method of claim 10, wherein grouping the current image with previously grouped images comprises adding the current image to a group with previously grouped images based on a similarity of features in the current image to features in images of the group.

13. The method of claim 10, wherein grouping the current image with previously grouped images comprises grouping the current image into groups based on at least one of regions of the respective image where the at least a portion of the machine component was detected, the image size, and an orientation of the at least a portion of the machine component.

14. The method of claim 10, wherein grouping the current image with previously grouped images comprises grouping the current image with a similarity measure of the previously grouped images.

15. One or more non-transitory computer-readable storage media having computer-executable instructions embodied thereon, wherein when executed by at least one processor, the computer-executable instructions cause the processor to:
receive, in real-time, a plurality of temporally-spaced images of a scene including a shovel bucket having a plurality of teeth spaced along a tooth line;
detect at least a portion of the shovel bucket including the tooth line in a current one of the plurality of images using a Histogram of Gradients (HOG) analysis;
compare the current image to previous captured images sorted into a plurality of groups of images having similar characteristics;
generate an alert if predetermined characteristics of the current image deviate from corresponding characteristics of the grouped images by less than the predetermined amount;
update the groups with the current image if predetermined characteristics of the current image deviate from corresponding characteristics of the grouped images by less than the predetermined amount; and
output at least one of the alert and an image of the damaged component.

16. The computer-readable storage media of claim 15, wherein the computer-executable instructions further cause the processor to detect the tooth line using a feature vector analysis.

17. The computer-readable storage media of claim 15, wherein the computer-executable instructions further cause the processor to add the current image to a group with previously grouped images that have features similar to the current image.

18. The computer-readable storage media of claim 15, wherein the computer-executable instructions further cause the processor to group the current image with previously grouped images that are organized into groups based on at least one of regions of the respective image where the at least a portion of the tooth line was detected, the image size, and an orientation of the at least a portion of the tooth line.

* * * * *